United States Patent Office 3,424,816
Patented Jan. 28, 1969

3,424,816
ETHYLENE OLIGOMERIZATION
James D. McClure, Oakland, and Kenneth W. Barnett, San Leandro, Calif., assignors to Shell Oil Company, New York, N.Y., a corporation of Delaware
No Drawing. Filed Dec. 15, 1967, Ser. No. 690,763
U.S. Cl. 260—683.15         3 Claims
Int. Cl. C07c 3/10

ABSTRACT OF THE DISCLOSURE

Ethylene is oligomerized using π-(cyclopentenyl) cyclopentadienylnickel as the homogeneous catalyst.

Background of the invention

A variety of oligomerization catalysts, both homogeneous and heterogeneous, have been utilized to convert, i.e., oligomerize, ethylene into olefinic products of higher molecular weight. However, the character and relative proportions of the product mixture components are greatly dependent upon the particular catalyst employed. One homogeneous process is that of Tsutsui et al., J. Polymer Sci., A–1, 5, 681 (1967), which employs nickelocene, i.e., bis(cyclopentadienyl)nickel, as catalyst to produce a product mixture essentially comprising butene and a small proportion of hexene. It would be of advantage, however, to obtain a product mixture having a relatively high proportion of olefin products in the $C_6$ to $C_{10}$ range, which products are advantageously linear in character.

Summary of the invention

It has now been found that an improved process of ethylene oligomerization is obtained when π-(cyclopentenyl)cyclopentadienylnickel, a partially hydrogenated nickelocene, is employed as the homogeneous oligomerization catalyst. The process is characterized by a relatively high rate of oligomerization to a product mixture of relatively high proportions of linear $C_6$ to $C_{10}$ olefin.

Description of preferred embodiments

The process of the invention, broadly speaking, comprises contacting, in a liquid reaction environment, ethylene and the π-(cyclopentenyl)cyclopentadienylnickel catalyst at a somewhat elevated temperature and pressure. The nickel-containing catalyst is a known compound, being disclosed, for example, by Wollensak, U.S. 3,088,960, issued May 7, 1963.

In order to facilitate ethylene-catalyst contact, a reaction diluent is customarily employed which is liquid under the conditions of the oligomerization process. Suitable diluents are inert to the reaction and product mixtures and include hydrocarbons and halohydrocarbons such as hexene, octane, dodecane, cyclohexane, decahydronaphthalene, benzene, toluene and chlorobenzene. It should also be appreciated that initially produced ethylene oligomer products, e.g., hexenes, octenes, decenes, and the like, are also present and may serve as diluent. Molar amounts of added reaction diluent up to about four times the molar amount of ethylene are satisfactory, with molar amounts of added diluent of up to about twice the molar amount of ethylene being preferred.

In the oligomerization process, the ethylene is contacted with from about 0.001% mole to about 1.0% mole of the catalyst based on the ethylene. The method of effecting reactant-catalyst contact is not critical and in one modification the ethylene, reaction diluent and catalyst are charged to an autoclave or similar pressure reactor and maintained at reaction temperature and pressure. In another modification, olefin oligomerization is effected in a continuous manner as by contacting the ethylene, reaction diluent and catalyst during passage through a tubular reactor maintained at elevated temperature. By any modification, the oligomerization process is conducted at elevated temperature and pressure. Suitable reaction temperatures are from about 110° C. to about 225° C. with the temperature range from about 130° C. to about 180° C. being preferred. The optimum reaction pressure will in part depend on the particular reaction temperature employed, but pressures sufficient to maintain at least a substantial portion of the ethylene in a liquid phase are satisfactory. Pressures from about 10 atmospheres to about 75 atmospheres are typical.

At the conclusion of the reaction, the product mixture is separated and the olefin oligomer product is recovered by conventional means such as fractional distillation, selective extraction, adsorption and the like.

The olefin oligomer products are materials of established utility and many are chemicals of commerce. The olefin products are polymerized to thermoplastic polyolefins, as with titanium chloride-aluminum alkyl catalyst systems, and are converted by conventional "Oxo" processes to aldehydes of one more carbon atom which are hydrogenated to corresponding alcohols. The $C_{12}$ and higher alcohols are ethoxylated with ethylene oxide in the presence of a basic catalyst, e.g., sodium hydroxide, to form conventional detergents and the lower molecular weight alcohols are esterified with polycarboxylic acids, e.g., phthalic acid, to form plasticizers for polyvinyl chloride.

To further illustrate the improved process of the invention, the following example is provided. It should be understood that the details thereof should not be regarded as limitations as they may be varied as will be understood by one skilled in this art.

Example

The oligomerization of ethylene was conducted in comparative experiments by charging to a reactor 15 grams of ethylene, 20 grams of benzene, and 2 millimoles of catalyst. In each case, the reactor was maintained at 150° C. for 0.5 hour, after which the product mixture was removed and analyzed by gas-liquid chromatography. The results of two runs are shown in the following table, wherein Run A employed nickelocene as catalyst and Run B employed the π-(cyclopentenyl)cyclopentadienylnickel of the invention as catalyst.

TABLE

|  | A | B |
|---|---|---|
| Ethylene conversion to oligomer, percent | 3–4 | 90 |
| Selectivity to product, percent: |  |  |
| Butene | >98 | 78 |
| Hexene | <2 | 15 |
| Octene | 0 | 3 |
| Decene | 0 | 1.5 |
| Dodecene | 0 | 1.5 |
| Tetradecene | 0 | 1.5 |
| Linearity of olefin product, percent: |  |  |
| Hexene |  | 86 |
| Octene |  | 78 |
| Decene |  | 64 |
| Dodecene |  | 50 |

We claim as our invention:
1. The process of oligomerizing ethylene by contacting ethylene, in a liquid reaction environment, with from about 0.001% mole to about 1.0% mole based on ethylene of π-(cyclopentenyl)cyclopentadienylnickel at a temperature from about 110° C. to about 225° C.
2. The process of claim 1 wherein the temperature of said contacting is from about 130° C. to about 180° C.

3. The process of claim 2 wherein the liquid reaction environment comprises up to about 4 moles of inert reaction diluent.

References Cited

UNITED STATES PATENTS

| 3,121,729 | 2/1964 | Fischer et al. | 260—439 |
| 3,134,824 | 5/1964 | Walker et al. | 260—683.15 |
| 3,379,706 | 4/1968 | Wilke | 260—683.15 X |

FOREIGN PATENTS 1,468,068  12/1966  France.

PAUL N. COUGHLAN, *Primary Examiner.*